APPARATUS FOR LIQUID TREATMENT OF FLAT MATERIALS

Original Filed Aug. 20, 1970 5 Sheets-Sheet 1

APPARATUS FOR LIQUID TREATMENT OF FLAT MATERIALS

Original Filed Aug. 20, 1970 5 Sheets-Sheet 2

APPARATUS FOR LIQUID TREATMENT OF FLAT MATERIALS

Original Filed Aug. 20, 1970 5 Sheets-Sheet 3

APPARATUS FOR LIQUID TREATMENT OF FLAT MATERIALS

Original Filed Aug. 20, 1970 5 Sheets-Sheet 4

APPARATUS FOR LIQUID TREATMENT OF FLAT MATERIALS

Original Filed Aug. 20, 1970 5 Sheets-Sheet

United States Patent Office

Re. 28,174
Reissued Sept. 24, 1974

28,174

APPARATUS FOR LIQUID TREATMENT OF FLAT MATERIALS

Winston E. Sabatka, Lakeville, Wilburn M. Bloomquist, Minneapolis, and Raymond W. Reinke, Rosemount, Minn., assignors to Finishing Equipment Inc.

Original No. 3,643,670, dated Feb. 22, 1972, Ser. No. 65,467, Aug. 20, 1970. Application for reissue Sept. 10, 1973, Ser. No. 395,832
Int. Cl. B05c *3/10, 11/14;* B08b *3/04*
U.S. Cl. 134—117 10 Claims

Matter enclosed in heavy brackets [ ] appears in the original patent but forms no part of this reissue specification; matter printed in italics indicates the additions made by reissue.

ABSTRACT OF THE DISCLOSURE

Plating or etching or other immersion treatment of lower portions only of horizontally fed, vertical positioned thin strips and arrays of workpieces is accomplished by recirculating electrolyte or the like through a bathtub provided with vertical slots to receive and discharge such workpieces. The rate of recirculation is such that an effective plating height well above the bottom of the vertical bathtub slots is maintained. A plurality of horizontally moving clamps support the workpieces and are electrically connected thereto as the workpieces move into, through, and out of the bathtub. These clamps are also electrically slidably connected to bus bars to form part of a complete electroplating circuit.

BACKGROUND OF THE INVENTION

Electrolytic treatment of metals for the purpose of depositing a dissimilar metal on a substrate metal, for example, and treatment of metals chemically as to eat away undesired portions in the production of "printed circuits" or other metallic articles has long been accomplished by batch methods. Such methods are always subject to certain inherent problems, and a major one is the lack of adaptability to high volume, completely uniform work production.

On some work pieces it is necessary that precious metals be deposited on certain portions thereof while it is unnecessary and highly undesirable that the entire piece be so treated. Batch methods or continuous process total immersion methods formerly utilized involved plating of the precious metal on the entire piece in order to get the desired metal on the desired surface. In instances where the surface area not needed to be coated with the precious metal is substantial, the cost of precious metal wasted is excessive. Also, where it is desired to have a first metal plated up to a certain height on a workpiece of a second metal, and a third metal plated over the second to a lesser height, such pieces have been impossible or impractical to produce by the aforementioned immersion methods.

In the past, to plate or etch or otherwise treat a flat continuous strip of work material, the flat strip has been supported in a horizontal plane, run over a roller to carry it from the horizontal, vertically down onto a roller situated inside of a bath, along through the bath, around through a further roller and vertically up out of the bath and onto the next work station. Certain difficulties in getting uniform plating or other liquid action simultaneously on both the bottom and top surfaces are often encountered by this method. While the method can be used on strip materials which are fairly rugged and susceptible to bending without damage, such a method is difficult or impossible on extremely thin or otherwise fragile pieces which cannot stand bending action during the treating process.

Furthermore, a substantial, and in some cases insurmountable, difficulty is the provision of an electrical connection to the work materials so that proper electrolytic action can take place throughout the bath.

For example, in one such situation an attempt to plate copper-coated nylon material 1 mil thick failed because connectors at the rollers outside of the bath had to handle currents of 100 amperes each so proper deposition could be obtained during the 10 feet of plating within the bathtub. These current concentrations destroyed the work.

SUMMARY OF THE INVENTION

An apparatus made according to the invention can include at least one process cell consisting of a bathtub, collection tanks, and headers. A sump tank is fed from the collection tank and a sump pump recirculates the electrolyte to the headers and back to the bathtub. The bathtub is provided with a pair of vertical aligned slots or openings at opposite ends thereof to permit work material to be fed into one slot and out of the other. Diverging, vertical guide walls extending through and beyond each vertical slot provide guidance to the work product and constriction to and laminar outflow from the bathtub.

The rate of recirculation, the dimensions and shape of the space between the guide walls, the volumetric displacement of the material being treated and the physical characteristics of the liquid all help determine the equilibrium point for the liquid surface in the bathtub. This equilibrium point is adjusted precisely with respect to the work material by means of adjusting screws which control the vertical positioning of the bathtub.

In order to obtain uniform, and as much as possible turbulent, flow of the recirculating liquid back into the bathtub, the sump pump connects to headers on both sides of the bathtub which open through a myriad of evenly spaced relatively small holes through a common wall between each header and the bathtub.

The foregoing elements of the invention are important whether the liquid in the bathtub is for the purpose of cleaning, etching, rinsing, developing, painting, plating, deplating or otherwise treating the horizontally moving, vertically positioned relatively narrow work materials.

Where electrolytic action is involved, an electrical plate or anode covers over this area of liquid recirculation from the header, and the plate is provided with holes aligned with the header holes so as not to constrict the flow of recirculating electrolyte. This anode can be constituted as a metal screen.

A plurality of clamps are supported on a horizontal conveyor which is positioned to move the clamps directly over the egress and exit slots of the bathtub. In the form of the invention shown, two parallel horizontal roller chains are utilized and their horizontal path is fixed by angles or flanges on which they ride during the critical portions of their paths while they are supporting the clamps over the bathtubs. The clamps are supported with respect to the chains by horizontal wood slats affixed to the bottom of the two conveyor chains, and an electrical connection extends from the electrically active jaw of each clamp to a point along its wooden slat to where it is electrically connected to a spring-loaded, normally upwardly extending contactor or brush.

On the main frame of the machine, bus bars are situated in alignment with these contactors and have upwardly tapering end portions which force the spring-loaded contactors into firm electrical contact with the bus bars as they move therealong. These bus bars are positioned to make electrical contact with the clamp before the work connected to the clamp enters the bathtub, to maintain this contact throughout its trip through the tub, and to relinquish the contact only after the work has left the tub. In this manner, a maximum dispersion of electrical current is obtained throughout continuous strip of work material, and the current density throughout any one clamp is minimized.

These clamps include a fixed jaw fixedly mounted to the wood slat, and a pivoted movable jaw resiliently urged toward the fixed jaw. Lower portions of the jaws which might otherwise be subjected to deleterious action by the bath materials due to a splashing or even immersion are covered with an impervious coating of plastic or the like, but one or both of the clamping ends of the jaws of the clamps are bare to allow electrical contact between the work material and the pump. Each movable jaw has an upwardly extending handle. A cam affixed to the main frame of the apparatus has a camming surface situated to come to bear on each handle as the clamp moves along its path, to force the handle in direction to open the clamp where the work material is inserted, and then to allow the clamp to close on the work material. A similar camming device at the output end of the machine releases the clamp at the point where the work material is to come off the machine.

IN THE DRAWINGS

FIG. 1 is a top plan view of one form of apparatus for practicing the present invention;

DESCRIPTION OF THE PREFERRED EMBODIMENTS

Figure 2:
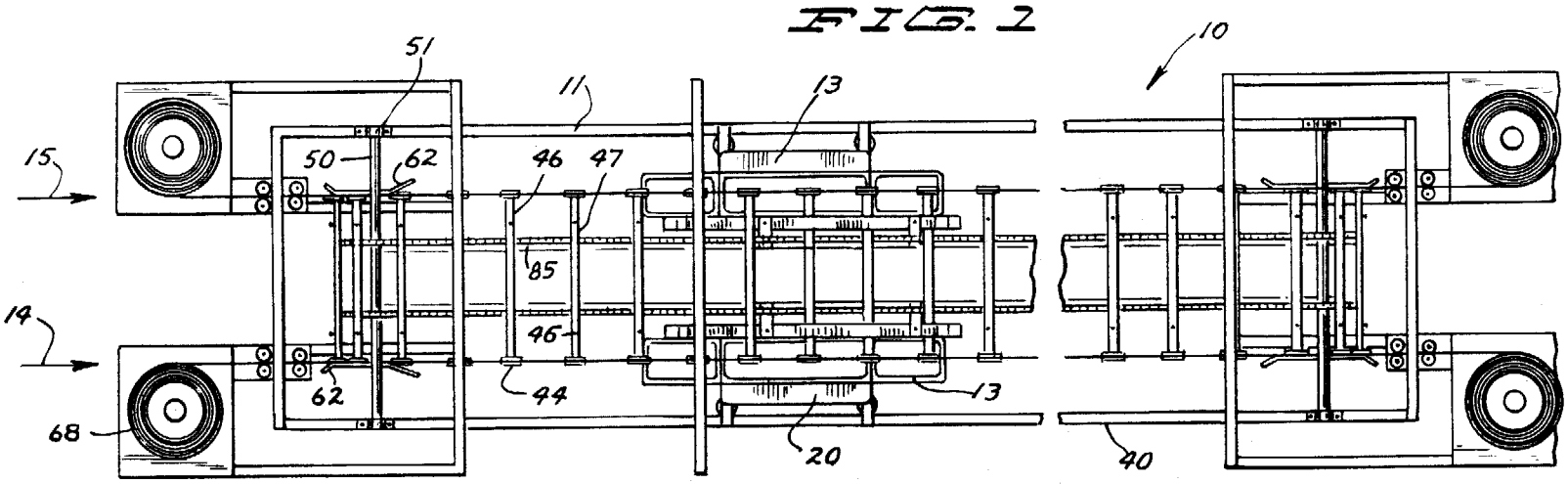
FIG. 2 is a side elevational view of the apparatus of FIG. 1.

An apparatus for electrolytic plating of a continuous horizontally moving, vertically positioned strip of material is illustrated generally at 10. It consists of a main frame 11 supported on a floor by legs 12. A plurality of process cells 13 are supported for precise vertical adjustment with respect to the main frame. In FIG. 1, two such cells are shown, one on one side of the machine and one on the other. In general, the action of each process cell as far as maintaining the level of liquid bath is concerned is the same. However, in a particular process, each cell along the apparatus can perform a different function. For example, a first cell can electroclean the work, a spray rinse station of any usual or preferred construction can then clean both sides of the continuous work strip passing through, a second cell can consist of an acid bath to further prepare the work, and the third cell can then be for the electrolytic deposit of gold, for example, on the workpiece. This can be followed by a reclaiming spray, two rinses, an alcohol spray wash, and a filtered air blowoff to dry the work.

Since all of the process cells act the same way as far as maintaining liquid level is concerned, a typical cell, namely one for use in electrolytic depositing of metal, is here shown and described. In order to present a typical machine, two separate apparatus mounted on the same main frame are shown. A first processing line moves a vertically positioned, continuous strip of horizontal material along a vertical plane generally shown by the arrow 14 (FIG. 1), while a second process is being performed on other work material along the plane of the arrow 15. In FIG. 1, the two process cells 13 along the two processing lines are shown to be in line with each other transversely of the apparatus, but it is to be understood that there is no necessity that this spacing be maintained or that the same process be performed down each of the two lines. It is necessary only that the rate of flow of the work material be uniform inasmuch as the clamps carrying the work move with two separate conveyor chains, which chains are driven on common shafts to have the same speed, as will be explained more fully.

Throughout the remainder of this description, the first process along the line of the arrow 14 will be described.

The process cell 13 includes a bathtub 17, two collection tanks 18 and 19, and a pair of headers 20, extending longitudinally along upper portions of the bathtub 17. This tub is provided with an entrance end wall 33 having an entrance slot 21 and an egress end wall 35 having egress slot 22 opening into the collection tanks 18 and 19 respectively. In turn, the end wall of the collection tank 18 is provided with an entrance slot 23 while the end wall of the collection tank 19 is provided with an egress slot 24.

The collection tanks 18 and 19 are provided with drain pipes 25 and 26 respectively, both of which open into a sump tank 27. As shown in side elevational view in FIG. 2, and as shown schematically in FIG. 9, a sump pump 29 pumps the liquid from the sump tank through a supply pipe 30 into the bottom of each of the headers. A throttle valve 31 may be provided in the sump supply line at an appropriate location to accurately control the flow into the headers 20 to obtain a degree of control over the height of liquid in the bathtub.

As perhaps best seen in FIGS. 3, 6, 8 and 9, angle iron runners 40, forming part of the main frame 11, threadably support four manually operable adjusting screws 41, having hand wheels 43. These screws, in turn, support transverse angle iron bolsters 42, which in turn support the cell 13 under the bathtub portion 17 thereof.

With sufficient flow through the sump pump 29 and supply pipe 30, the level of liquid in the bathtub will rise until an equilibrium is reached. Hand wheels 43 can be rotated to evenly raise or lower the cell 13 and consequently raise and lower this equilibrium height of liquid with respect to the main frame. This allows precise control of the depth of immersion of the work pieces in this liquid.

The flow from the headers into the bathtub is through a plurality of relatively small openings or holes 32 in the common walls 39 between these headers and the bathtub.

It is to be understood that with these elements of the system, some degree of operation of the invention would take place. The horizontal progress of vertically supported workpieces through slots 21 and 22 would result in the liquid acting on that portion of the work which was below the bath liquid level.

Under certain conditions, there would still be some difficulties to this mode of operation, however. For this reason the entrance end wall 32 which is provided with the slot 21 has upper portions adjacent the slot cut away to provide a triangular weir 34. Similarly, egress end wall 35, which is provided with egress slot 22 is likewise provided with a weir 36. It will be understood that these weirs, having throats substantially exactly on the same horizontal plane with each other, will tend to limit the upper level of liquid in the bathtub 17 to this horizontal plane.

Even this refinement is not sufficient in some cases, however. With just the slots 21 and 22, the weirs 34 and 36, the liquid flow through the slots would be a free fall flow, and a great amount of splashing into the collection tanks would ensue. This would necessitate making these collection tanks substantially longer to insure that no liquid splashed out through the egress and entrance slots 23 and 24, respectively, of those tanks. This is undesirable, and in some cases, completely unsatisfactory, as when it is necessary to wash off the work material within a very short period of time after it leaves the bath. Elongation of the collection tank 19, for example, will result, at the speeds necessarily used, in the work materials drying before they reach the spray station beyond the collection tank 19. Thus it is essential that the collection tanks be kept as short as possible.

Figure 9:
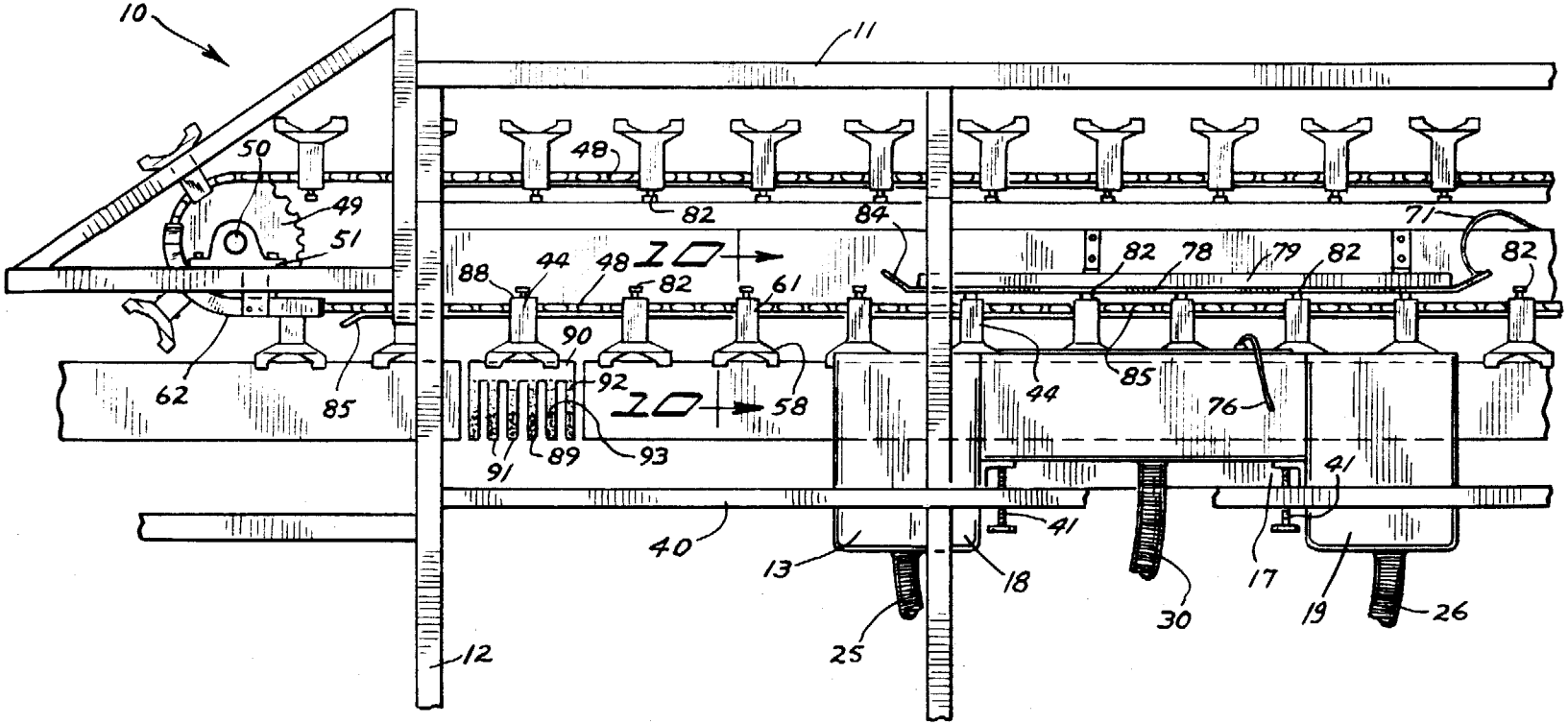
FIG. 9 is a vertical sectional view taken on the line 9—9 in FIG. 8.

In order to do this, a pair of vertical, diverging, funnel-like guide walls 37, 37 are provided in the entrance slot 21, and a similar pair of funnellike vertical guide walls 38, 38 are positioned in the slot 22. As best seen in FIG. 9, these guide walls can be fastened into the end walls 33 and 35 through the instrumentality of screws or stove bolts 95. By providing slotted openings 94 in the walls 33 and 35 a very precise adjustment of the space between these guides can be obtained.

Figure 6:
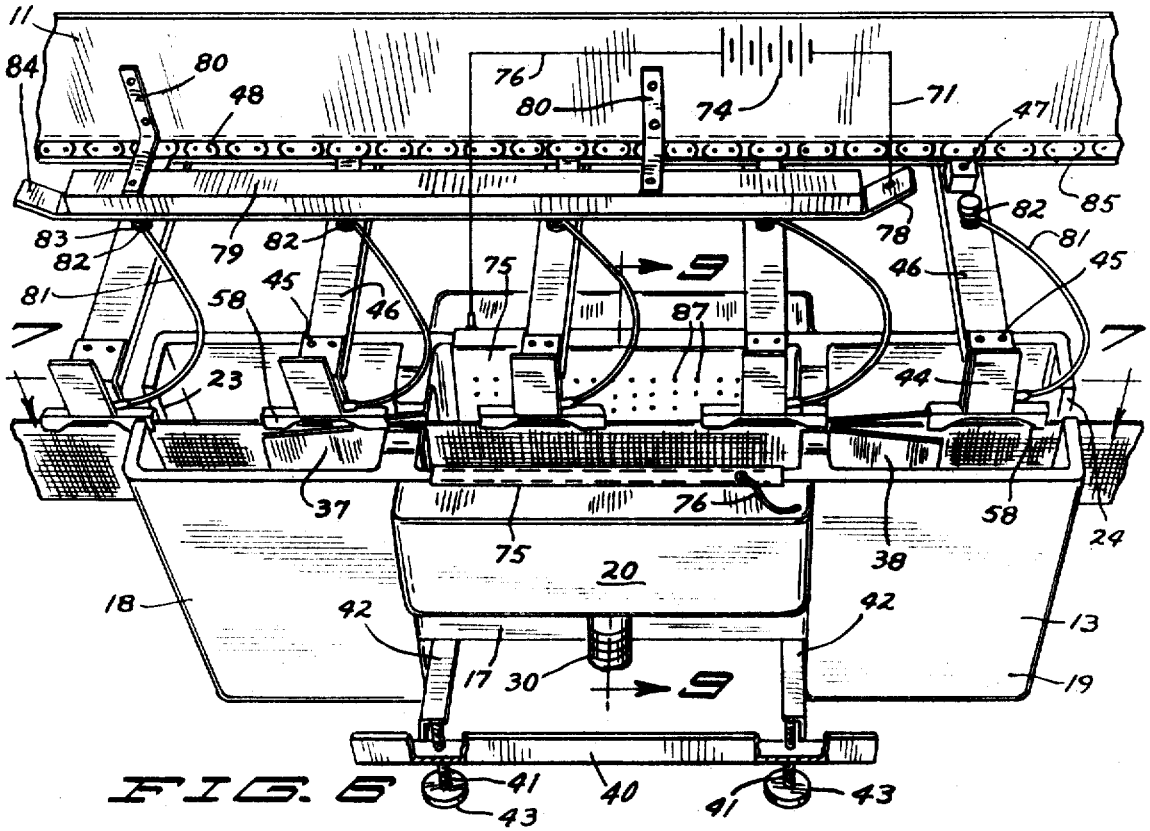
FIG. 6 is an enlarged fragmentary perspective view of one process cell showing its relationship to the clamp, the work material passing therethrough, the bus bar, and the electrical connections between the clamp and the sliding contactors and the bus bar.
Figure 7:
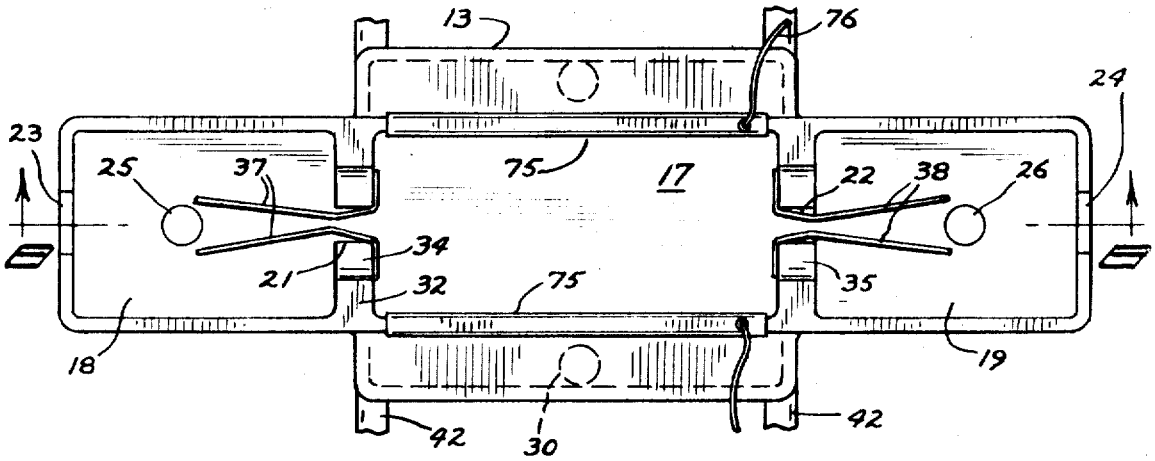
FIG. 7 is the top plan view of the process cell of FIG. 6.
Figure 8:
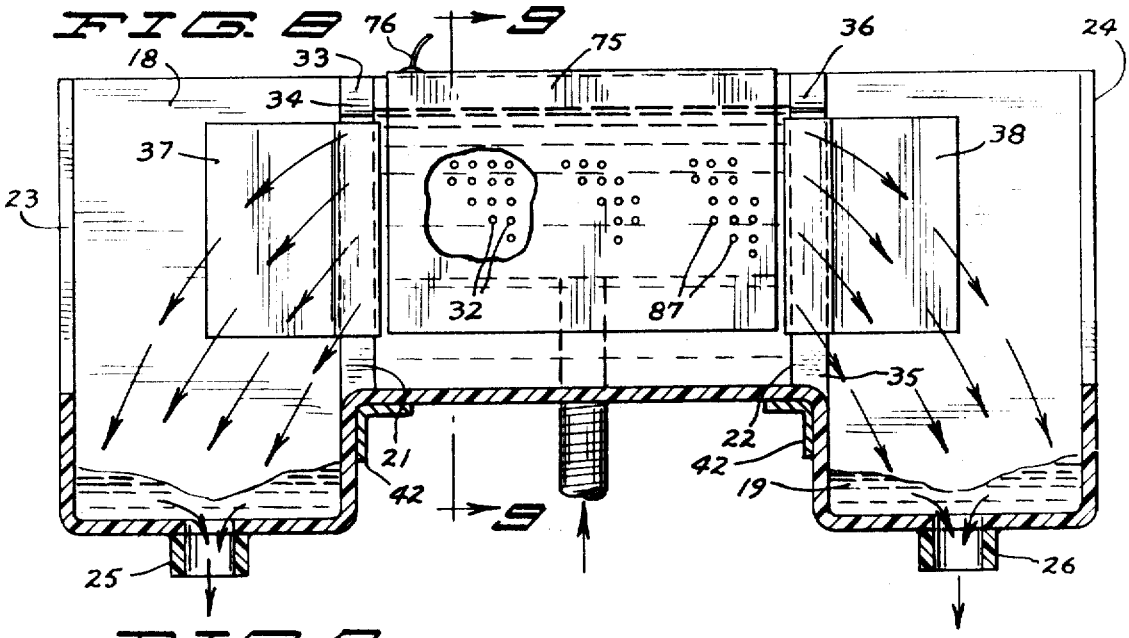
FIG. 8 is a vertical sectional view taken on the line 8—8 of FIG. 7.
Figure 9:
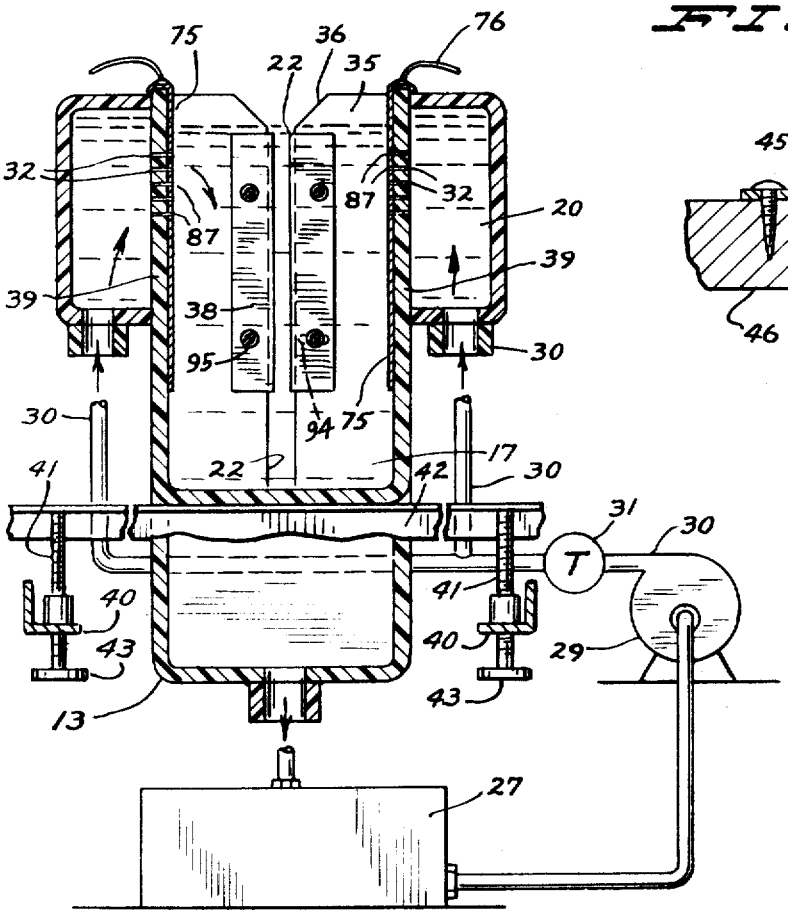

As illustrated in FIG. 8, and as will be understood from a consideration of FIGS. 6 and 7, the flow of liquid from the bathtub 17, through the space between the guides 37, 37 and 38, 38 and specifically through the throat portion thereof and beyond has been found to be laminar in character. The drag of the diverging guide walls has been found to cause the upper surface of the water to bend as indicated in FIG. 8. This friction, and the laminar flow, cause much of the energy of the liquid to be dissipated at the time the bottom or outer edge of the guide walls has been reached, and no great difficulty with splashing or turbulence has been encountered even with the relatively short collection tanks 18 and 19.

These guide walls 37 and 38 also position the work material properly as it passes into the bathtub and out of it. This is particularly important when a plurality of separate workpieces are being carried on edge, as will be explained below.

Figure 3:
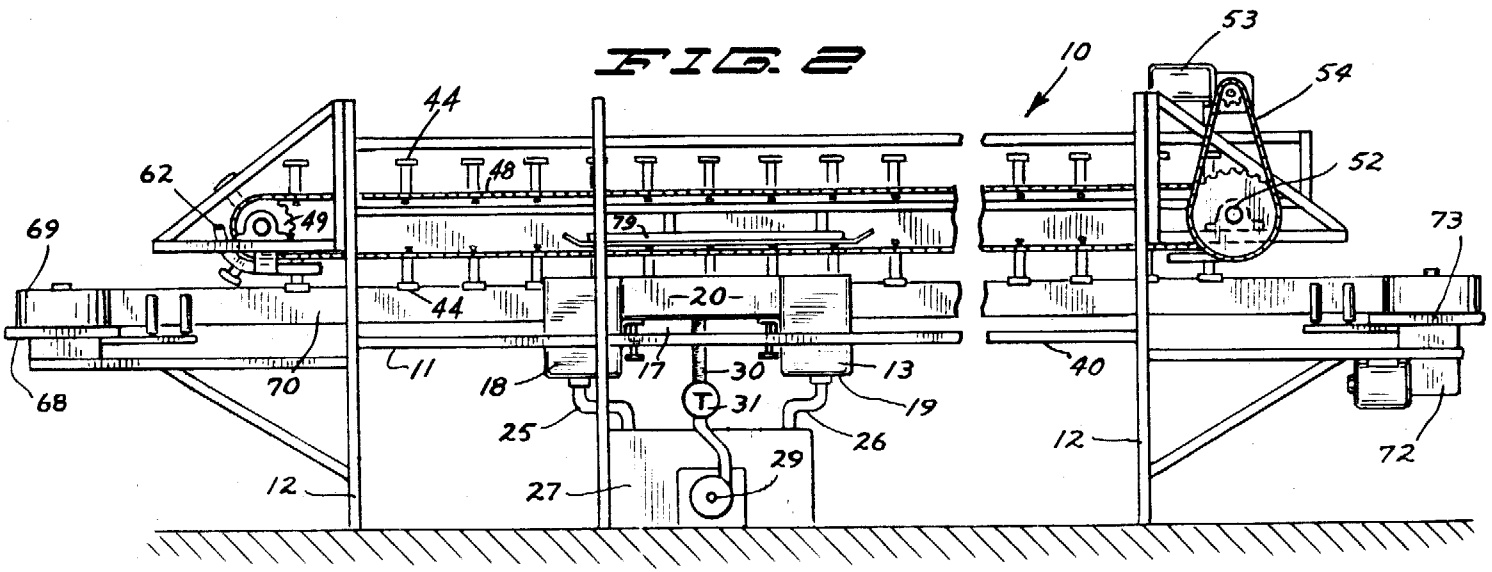
FIG. 3 is an enlarged fragmentary view of a portion of the left end of the machine as seen in FIGS. 1 and 2.

Work materials are carried through the process cells and along the processing line of the apparatus by clamps 44. Each clamp is fixedly mounted as at 45 to a wooden slat 46 which in turn is mounted as at 47, 47 to a pair of roller drive chains 48, 48. The drive chains run over idler sprockets 49 which run on an axle 50 supported in bearing 51 on the main frame 11. This is best seen in FIG. 3. The other ends of the roller drive chains 48, 48 run on drive sprockets on axle 52, which is driven by back geared motor 53 and the pinion, chain and sprocket drive 54. This is best seen in FIG. 2.

The clamp 44 includes a bifurcated fixed jaw 57 which is mounted to the slat 46 at 45, and a bifurcated pivoted jaw 58 pivotally mounted to the fixed jaw as at 59. A spring 60 urges the jaws towards closed relationship to each other.

Figure 4:
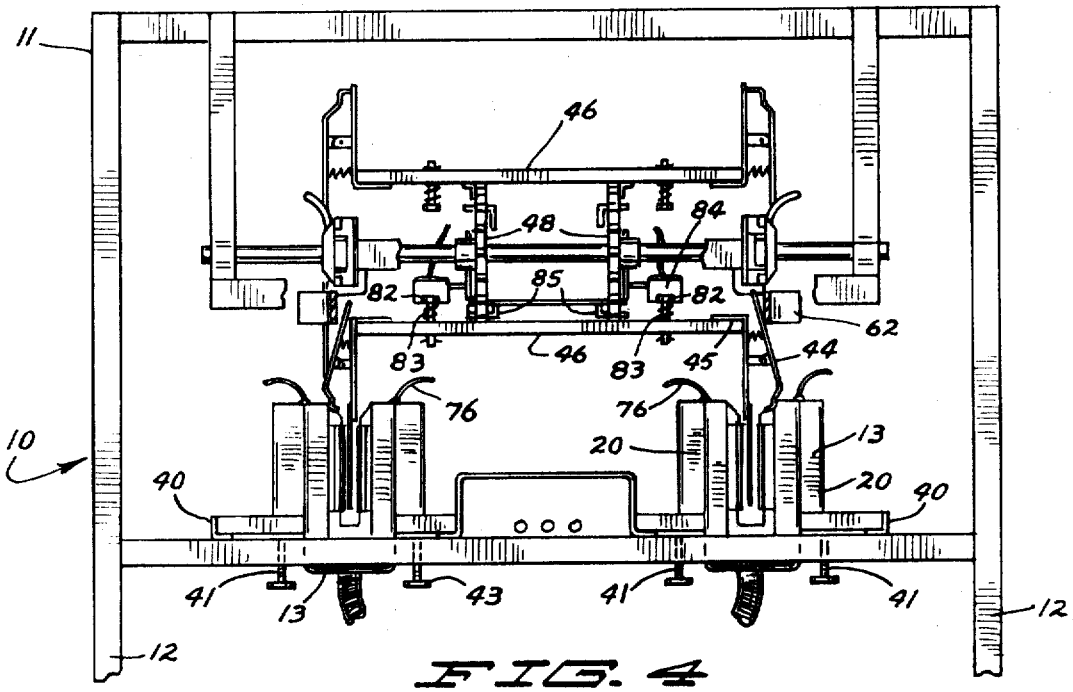
FIG. 4 is an enlarged fragmentary end elevational view of the machine as seen from the left of FIGS. 1, 2 and 3 with parts in sections and parts broken away.
Figure 5:
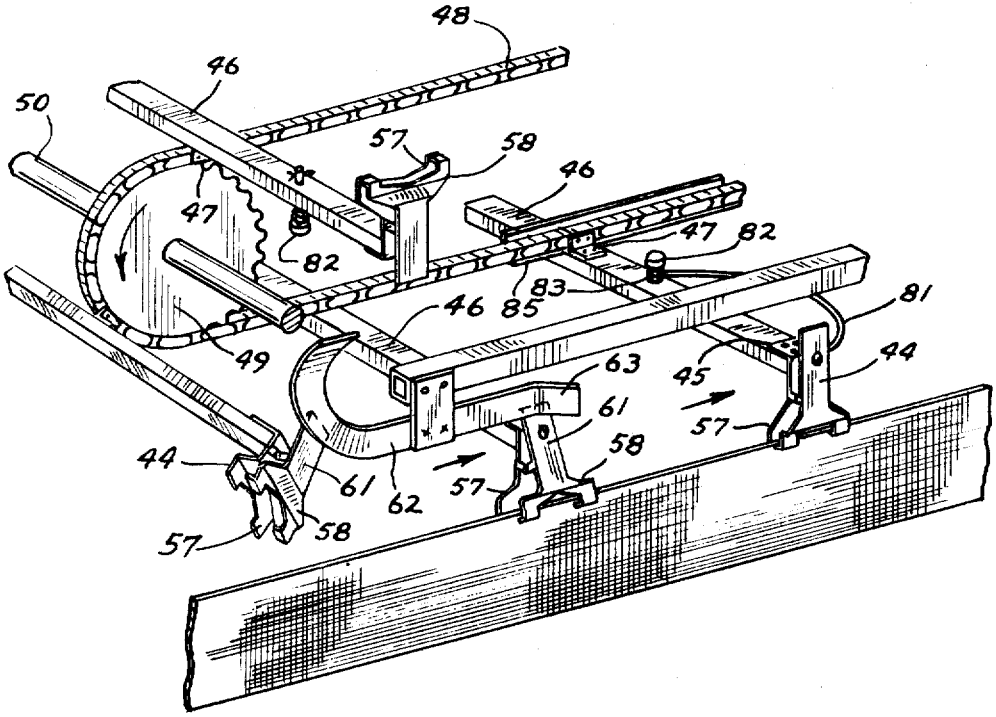
FIG. 5 is a fragmentary perspective view of portions of the left end of the apparatus as seen in FIGS. 1, 2 and 3 and showing the relationship of one of the conveyor chains, the wood slats, the clamps, the clamp opening and closing cam, and a continuous strip of work material supported in said clamps.

Mounted to the main frame 11, as seen in FIGS. 1, 2, 3 and 4 and as perhaps best seen in FIG. 5, is a clamp opening cam 62. The pivoted jaw 58 of each clamp has an upstanding arm 61 integral with it. As each clamp comes around the entrance end of the roller chain drive path, its arm 61 is picked up by the camming surface of the cam 62 and, as it slides along this surface, the handle is forced in direction toward the wood slat which supports the clamp, and the jaws open up as best seen in FIG. 5. While the jaws are open, the work material being processed will be drawn into position between the jaws by the action of other clamps working along the horizontal conveyor path. When this relationship of clamp to work material is established, the arm 61 reaches a part 63 the cam 62 which is bent to allow this arm 61 and the entire jaw 58, acting under the urging of the spring 60, to move into clamping relationship to the work.

Figure 10:
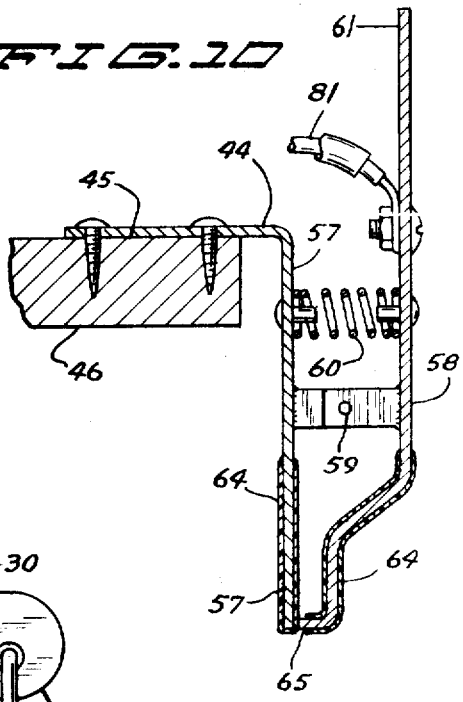
FIG. 10 is a transverse enlarged vertical sectional view of a clamp and the end of the wood slat to which it is attached taken on the line 10—10 in FIG. 3.

As shown in FIG. 10, lower end portions of the clamp can be coated with impervious plastic coatings 64 to prevent interaction of the metal jaws of the clamp with the electrolyte or other liquid being utilized in the process. At least some portion 65 of at least one of the jaws will be left as bare metal, thus insuring a good electrical contact between the clamp and the work material held therein.

One means of automatically feeding a continuous strip of work material for processing is to provide a platform or turntable 68 on which is supported a coiled supply 69 of work material 70 to be processed. In order to start the feed of this material down the processing line, it is necessary only that the first clamp beyond the cam 62 be manually opened and the work material 70 be properly positioned therein. Then the motor drive 53 is activated, and this first clamp will carry the work material along as subsequent clamps are applied to it.

At the output end of the apparatus, similar cams are provided to release the work material, and it will be necessary to provide a power drive 72 for a takeup turntable 73 to "collect" the processed work material.

To obtain electrolytic action, a first terminal from a source of electrical power 74, illustrated diagrammatically in FIG. 6 is electrically connected by wires 76 to anodes 75 which are positioned in the bathtub adjacent to each of the common walls 39, 39 between the headers 20 and the bathtub 17.

A second terminal from this source of electrical power 74 is connected by wire 71 to a bus bar 78, also as diagrammatically shown in FIG. 6. This bus bar is supported on a wood block 79 which is affixed to the main frame 11 by brackets 80, 80.

A wire 81 extends from the movable jaw 58 of each clamp 44 to have electrical connection with an associated contactor or brush 82 slidably mounted in its wooden slat 46. Each brush is urged in upward direction by a spring 83. As best seen in FIGS. 3 and 4, the bus bar 78 has an upturned camming end 84 in alignment with the contactors 82 in position to force each of these contactors slightly downward against the spring 83 at position before its clamp 44 carrying a particular portion of the work material is in position over the bathtub. This sliding electrical contact between the contactor 82 and the bus bar 78 is maintained until the particular clamp has cleared vertical alignment with the bathtub.

In order to insure that the clamp will remain precisely in a horizontal plane as it carries the work materials through the tub, an angle bracket 85 is provided on the main frame in position to support the bottom surface of the roller chain 48.

As shown, the anode is constituted as a metal plate having openings 87 therein in alignment with the openings 32 in the wall 39 between the header and the bathtub.

Another structure of anode which is effective is formed of a screen or having the dimensions of a hardware cloth, thus providing the necessary metal in parallel uniform proximity to both surfaces of the work as it passes through the bathtub and still allowing for passage of the electrolyte therethrough. Spaced parallel bars electrically connected to each other will have somewhat the same effect.

In an electrolyte bath of 10 feet in length, for example, the structure of the present invention has the advantage that clamps can be spaced so that a large number of points of electrical contact are present between the clamps and the work materials. Thus the concentration of current at any one point is kept to an absolute minimum. Such an arrangement provides for very much less than the current density which must be present when there is but one contact with the work material at a point outside of the bathtub on the entrance side thereof and another point of contact outside of the bathtub on the egress side. The constitution of the clamps as each having two prongs further maximizes the number of contacts and minimizes the current density at any particular point of contact.

While the specification thus far has dealt primarily with continuous flat strips of material to be plated, the method and aparatus of the invention may be used with equal effectiveness on flat individual sections of work materials. This is illustrated in FIG. 3 where one of the clamps 44 is also identified as clamp 88. This clamp is holding an individual workpiece 89. This work piece includes a common metallic strip 90 out from which fingers 91 extend. These fingers can be of the same substrate metal as the piece 90, and can be formed in a stamping operation, for example. In some instances, such a workpiece will be ultimately used in the form as it is processed, and in other instances before its ultimate use, the common metallic strip will be broken or cut away to leave individual parts which are plated at certain desired locations. As an example, the workpiece 89 is shown as having been plated twice. In this instance, the process cell shown in the drawing of FIG. 3, instead of being for plating, could be for giving the already plated piece a final cleaning path.

Assuming that the substrate metal is coated with coper up to the point 92 and with gold up to the point 93, the workpiece 89 has been sent through a copper plating process cell in which the upper surface of the electrolyte was in horizontal alignment with the point 92. This can be accomplished by placing the work material higher up inside of the clamp 88 or by changing the level of the process cell with respect to the main frame through the instrumentality of adjusting screws 41, or by varying the electrolyte flow or some other factor listed above. Usually the level will be changed by adjustment of the screws 41. After the copper plating was accomplished, and any other necessary or desired steps performed, the workpiece 89 was sent through a process cell in which the upper level of the electrolyte was in alignment with the point 93, and a layer of gold, for example, was plated in the piece. Thus the resulting parts will have a plating of copper to the desired height and will have a plating of gold to the desired height, and no extra gold or copper will be wasted on the pieces.

Either the individual workpieces such as 89 can be manually positioned on a guide under the clamp opening cam 62 to be picked up by a clamp 44; or an automatic feed (not shown) can support these pieces to be so picked up. Each workpiece will be released from the apparatus by the opening of the clamp at the output end of the apparatus.

Uniform plating, cleaning, etching or other action will be obtained in the use of the method and apparatus of the present invention inasmuch as there is a vigorous mixing action involved when the liquid falls from the collector tanks, into the sump tank, is pumped rapidly through the sump pump, and discharged through a header of substantial volume through the many tiny openings to have a washing, turbulent, scrubbing action against the work material progressing slowly in front of it. There is, in other words, no way in which isolated pockets of spent and concentrated electrolyte can accumulate. Thus, the particular solution batch of liquid can be used right up until the time it is almost entirely spent.

The embodiments of the invention in which an exclusive property or privilege is claimed are defined as follows:

1. Apparatus for processing only predetermined lower portions of relatively flat workpieces through a liquid bath, said apparatus having a main frame, a bathtub mounted on said main frame and having a pair of end walls at opposite ends thereof, each of said walls being provided with relatively narrow vertical slots of width sufficient to pass said workpieces when moved vertically and on edge, means supported on said frame to support said flat workpieces to be in vertical aligned edgewise relationship to the slots and to cause lower portions of said workpieces to move through a first entrance slot, said tub and a second egress slot, a pair of collection tanks positioned to receive liquid flowing out from said tub through said slots, means for recirculating said liquid from said tanks into said tub at a rate sufficient to establish and to maintain a predetermined liquid depth in said tub above the bottom of said vertical slots and to exactly encompass the predetermined lower portions of said workpieces[.], *two sets of vertical guidewalls, each set being positioned within one of said slots, and each set extending divergingly outwardly from the tub in position to serve in said entrance slot as a guide to lead oncoming work pieces into said slot and to serve in said egress slot to tend to support the emerging workpieces as they move out of said tub, the angle of divergence being such as to limit flow therethrough to laminar flow.*

2. The combination as specified in claim 1 and means for precisely adjusting the vertical positioning of said bathtub with respect to said means to support and move said workpieces.

3. The combination as specified in claim 1 wherein said means to recirculate includes at least one header on a side of said tub to be in facing, spaced, parallel relation to the path of work material moving therethrough, a common wall separating the interior of said tub from the interior of said header, said common wall being provided with a plurality of holes to permit recirculating liquid to pass from said header into said tub.

[4. The combination as specified in claim 3 and two sets of vertical guide walls, each set being positioned within one of said slots, and each set extending divergingly outwardly from said tub in position to serve in said entrance slot as a guide to lead oncoming workpieces into said slot and to serve in said egress slot to tend to support emerging workpieces as they move out of said tub.]

[5. The combination as specified in claim 4 wherein the angle of divergence is such as to limit liquid flow therethrough to laminar flow.]

6. The combination as specified in Claim [4] *1* and means for accurately adjusting and fastening each pair of guidewalls with respect to each other to precisely control the maximum effective dimension of the slot.

7. The combination as specified in claim 1 wherein said means to recirculate includes a pair of headers, each situated on a side of said tub to be in facing, parallel relation to the other on opposite sides of the path of the work material moving through the tub, common walls separating the interior of said tub from the interiors of each of said headers, said common walls being provided with a plurality of holes to permit recirculating liquid to pass from said header into said tub, said recirculating means also including a sump tank, drain conduits open from a bottom portion of the collection tanks into the sump tank, and a pump and conduit means for pumping said liquid from said sump tank into the headers.

8. The combination as specified in claim 7 and means for accurately controlling the volume of liquid delivered by said pump thus to accurately control the depth of liquid in said tub.

9. The combination as specified in claim 8 and means for precisely adjusting the vertical positioning of said bathtub with respect to said means to support and move said workpieces.

10. The combination as specified in claim 1 wherein said means to support and move said flatwork pieces includes a horizontal conveyor mounted on said main frame and adapted to move in a plane parallel to a vertical plane passing through said bathtub slots, and a workpiece clamp mounted to move with said conveyor.

11. The combination as specified in claim 10 wherein said clamp includes a fixed jaw fixedly mounted to move with said conveyor, a pivoted jaw pivoted to said fixed jaw and resiliently urged into closing relationship with it, an arm integral with said pivoted jaw and extending upwardly therefrom, a first cam on said main frame in alignment with said pivoted jaw arm and adapted, before said material is processed, to force said arm in direction to open said clamp to hold it open while work material is inserted therein and to allow said clamp to close, a second cam on said main frame to open said clamp to permit work material to pass therefrom when said material has been processed by said apparatus.

12. The combination as specified in claim 1 wherein an upper portion of said slots of each of said entrance and egress walls is enlarged beginning at a point marking the predetermined liquid depth in the tub to provide for the rapid increase in the cross-sectional size of said slots.

References Cited

The following references, cited by the Examiner, are of record in the patented file of this patent or the original patent.

UNITED STATES PATENTS

| | | | |
|---|---|---|---|
| 2,618,284 | 11/1952 | Purnell | 134—130 X |
| 2,811,163 | 10/1957 | Weber et al. | 134—125 X |
| 2,845,077 | 7/1958 | Branson | 134—130 X |
| 2,919,705 | 1/1960 | Vitense | 134—130 X |
| 3,039,432 | 6/1962 | Le Boutillier et al. | 134—117 X |
| 3,103,694 | 9/1963 | Zebarth et al. | 134—128 X |

ROBERT L. BLEUTGE, Primary Examiner

U.S. Cl. X.R.

134—125, 128, 130